(No Model.)
W. STRAIT.
SIDE HILL PLOW.
No. 540,845. Patented June 11, 1895.
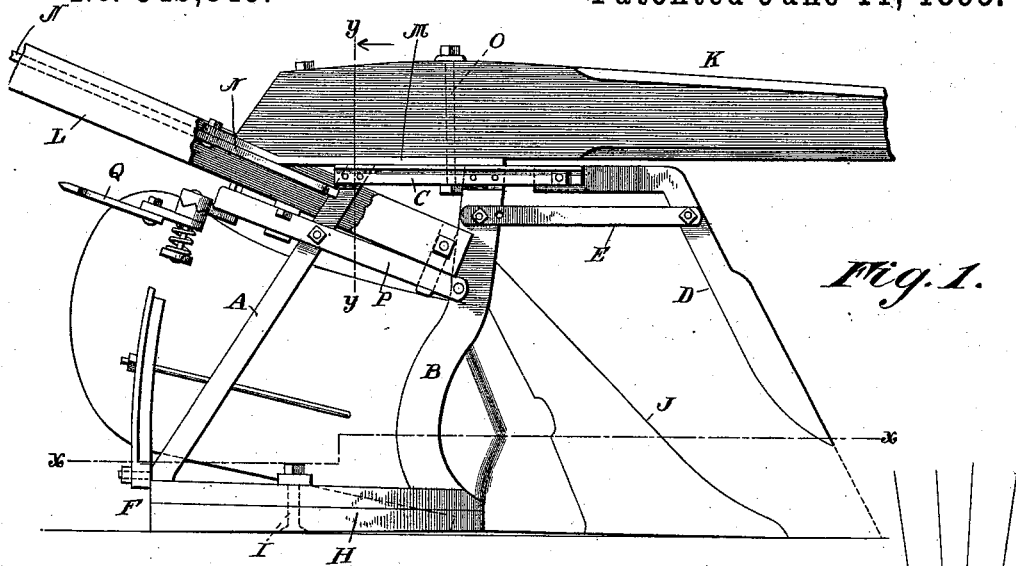
*Fig. 1.*
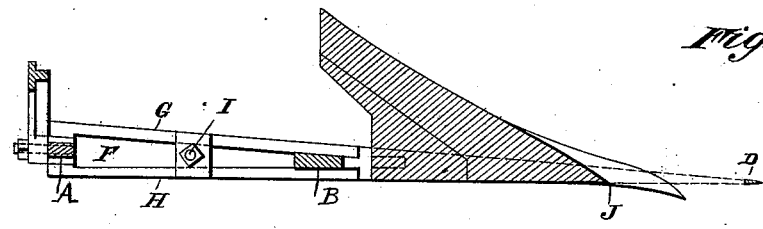
*Fig. 2.*
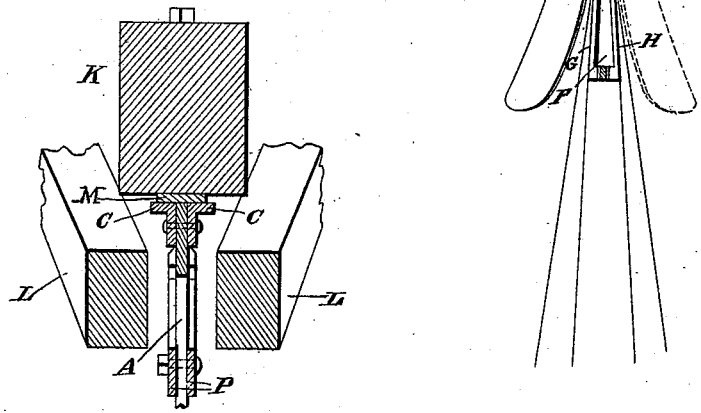
*Fig. 3.*
*Fig. 4.*
Attest:
Edw. S. Duvall Jr.
Chas. E. Tasker.
Inventor:
William Strait
by Fenelon B. Brock
Atty.
THE NORRIS PETERS CO., PHOTO-LITHO., WASHINGTON, D. C.

UNITED STATES PATENT OFFICE.

WILLIAM STRAIT, OF ELMIRA, NEW YORK.

SIDE-HILL PLOW.

SPECIFICATION forming part of Letters Patent No. 540,845, dated June 11, 1895.

Application filed November 14, 1894. Serial No. 528,767. (No model.)

*To all whom it may concern:*

Be it known that I, WILLIAM STRAIT, a citizen of the United States, residing at Elmira, in the county of Chemung and State of New York, have invented certain new and useful Improvements in Side-Hill Plows, (Case A;) and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a side elevation of a side-hill plow, partly broken away, to which I have applied my improvements. Fig. 2 is a horizontal section on the line $x\ x$ of Fig. 1. Fig. 3 is a detail vertical section on the line $y\ y$ of Fig. 1. Fig. 4 is a part plan, section, and diagrammatic view hereinafter referred to.

My invention relates to plows.

The objects of my improvements are to provide a side-hill plow with a fixed colter which will maintain the same relative position with respect to the cutting edge of the plow when the mold-board is on either side of the plow; and to further provide such plow with stationary handles which permit the operator to walk between the same in the middle of the furrow, no matter on which side the mold-board may be; and further to provide such a plow with a shifting beam, by means of which such results are obtainable.

A further object of the invention is to provide a novel plow-standard.

In the drawings, the plow-standard is composed of two upright pieces, A and B, which are secured at the top by double horizontal parallel angular irons C, firmly secured thereto. Between the forward projecting arms of these steel angle bars C is pivoted a colter D adjustably secured in operative position by a bar or bars E having a series of holes therein whereby the colter is locked to the forward standard bar B.

F is the land side of the plow rigidly connected with the lower ends of the standard bars A and B. This land side has the usual shoe bolted upon the foot thereof, by means of the bolt I.

The land side F is of wedge shape, being narrower at its front end and widened at its rear, the opposite sides of which form two wedge-shaped land-sides G and H, alternately used as the mold-board is thrown from one side to the other. The cutting edge of the colter D is placed at the point where the prolongation of the lines of the converging land-sides G and H intersect each other in front of the share J, and the share J in either of its positions in shifting the mold-board will intersect one of the lines drawn from the cutting edge of the colter to either one of the land-sides G or H.

I do not claim in this application the converging land-sides, the sides of which intersect the share and the colter, because, by them alone, I have not been able to construct and operate a plow, but I combine therewith a swiveling beam K and stationary handles L, by means of which results of the highest importance accrue.

K is the beam provided with a plate M on the under side bearing on the angle-bars C, and connected in its rear with a lever N projecting outwardly between the handles for the purpose of shifting the beam. O is the pivot-bolt of the beam. It rests in lugs between the angle-bars C securing it against any movement therein.

P is a pair of cross-bars securely fastened to the standard bars A and B, for the purpose of bracing the same and providing means for securing the handles L to the standard and also the latch device Q for locking the mold-board upon either side.

The use of angle-bars C disposed horizontally along the top of the standard enables me to lighten the weight of the plow very materially, at the same time securing the necessary rigidity and strength and further providing a broad flat surface upon which the beam K is held and oscillated.

In the use of the wedge-shaped double land-side, the lines of which intersect the cutting edge of the colter fixed in one position, I am enabled to use in connection therewith rigid handles which do not have to be made adjustable laterally to permit the operator to walk squarely in the furrow. In using such construction with a rigid beam I found that the plow however would not operate, as there was a constant tendency of the plow point and share to get away from the land toward the furrow side, a tendency which could not be overcome by the efforts of the operator. Such a plow with a fixed colter, and a wedge-shaped shoe and land-side, and stationary handles was practically inoperative. I overcome this objection by combining with such a structure a swiveling beam by means of which the line of draft could be thrown over more or less to the required degree toward the side upon which the mold-board is, whereby the point and share are given a tendency to move toward the land to that degree necessary to give the desired cut. The radiating lines from the fixed colter coincide with the lines of the land-side upon either of its sides. The radiating lines of draft intersect radial lines drawn through the pivotal center of the beam in the rear of the colter, and the lines drawn through the colter along one side or the other of the land-side. Ordinarily, where fixed colters have been used in connection with side-hill plows, the colter has cut in a line either to the right or to the left of the share, according to which side the mold-board was on; and where the fixed colter has been made to coincide with the share in both positions of the mold-board the device has been inoperative, for the want of proper provision for such a correct line of draft as would neutralize the tendency of the plow so constructed to move away from the land.

I claim—

1. In a hill-side plow, the combination substantially as set forth, of a double converging land-side, a fixed colter located at the intersecting point of lines coincident with the faces of the land-side, and a pivoted beam, whereby the plow may be regulated.

2. In a hill-side plow, the combination, substantially as set forth of a double converging land-side, a fixed colter located at the intersecting point of lines coincident with the faces of the land-side, a pivoted beam, and stationary handles, whereby the plow may be regulated.

3. In a plow, the standard composed of the upright pieces having angle bars secured to their upper ends on each side thereof whereby a base is provided for the swiveling beam, and an opening provided for the pivotal bolt.

4. In a plow, a standard comprising the upright pieces, angle bars secured thereto between which is secured the pivot bolt and the colter, and intermediate cross-bars for carrying the mold-board latch.

In testimony whereof I affix my signature in presence of two witnesses.

WM. STRAIT.

Witnesses:
J. FRED. KELLEY,
FENELON B. BROCK.